(12) United States Patent
Lin

(10) Patent No.: US 7,836,084 B1
(45) Date of Patent: Nov. 16, 2010

(54) CENTRAL DATABASE ROUTING FOR DISTRIBUTED APPLICATIONS

(75) Inventor: Chieh-Chien Lin, Gaithersburg, MD (US)

(73) Assignee: Verizon Services Corp., Ashburn, VA (US)

( * ) Notice: Subject to any disclaimer, the term of this patent is extended or adjusted under 35 U.S.C. 154(b) by 607 days.

(21) Appl. No.: 11/350,028

(22) Filed: Feb. 9, 2006

(51) Int. Cl.
*G06F 17/30* (2006.01)

(52) U.S. Cl. ........................... 707/792; 707/705
(58) Field of Classification Search ............ 707/1–10, 707/100–104.1, 200–206; 709/217, 218, 709/219
See application file for complete search history.

(56) References Cited

U.S. PATENT DOCUMENTS

| | | | | |
|---|---|---|---|---|
| 5,901,214 A | * | 5/1999 | Shaffer et al. | 379/211.02 |
| 2002/0064149 A1 | * | 5/2002 | Elliott et al. | 370/352 |
| 2003/0023601 A1 | * | 1/2003 | Fortier et al. | 707/10 |
| 2003/0065662 A1 | * | 4/2003 | Cosic | 707/9 |
| 2003/0216143 A1 | * | 11/2003 | Roese et al. | 455/456.1 |
| 2003/0217122 A1 | * | 11/2003 | Roese et al. | 709/219 |
| 2004/0117439 A1 | * | 6/2004 | Levett et al. | 709/203 |
| 2005/0193269 A1 | * | 9/2005 | Haswell et al. | 714/38 |
| 2007/0060099 A1 | * | 3/2007 | Ramer et al. | 455/405 |

* cited by examiner

*Primary Examiner*—Diane Mizrahi

(57) ABSTRACT

A datum is requested and a location table is searched for an identifier associated with the datum, wherein the location table comprises a location for the datum; further wherein the location is associated with the identifier. A location of a remote database that includes the datum is determined, and a request for the datum is sent to the remote database according to the location.

26 Claims, 2 Drawing Sheets

| Key | Address1 | Address2 |
|---|---|---|
| key₁ | primary address | secondary address |
| key₂ | primary address | secondary address |
| ... | ... | ... |
| keyₙ | primary address | secondary address |

210 — Key
220 — Address1
230 — Address2
140 →

CENTRAL DATABASE ROUTING FOR DISTRIBUTED APPLICATIONS

BACKGROUND INFORMATION

Distributed applications generally use a plurality of databases to supply requisite application data. Under one common data distribution model, a central data repository, generally a database that is physically remote from the computers by which users access the distributed application, contains a complete set of application data. However, in order to provide users with more efficient access to application data, a database local to a user contains a duplicate set of some or all of the requisite application data. Accordingly, this approach requires synchronizing the remote central database with a plurality of local databases on a regular basis. For example, many applications require a periodic, e.g., nightly or daily, download, or replication, of data from a central data repository to local databases. This data replication consumes processing and network overhead and, if interrupted or corrupted, introduces possible errors into the distributed application. In addition, more complex data distribution models are often used, in which the central data repository is itself spread across two or more physical databases, meaning that the central data repository must itself be synchronized or updated before the central data repository can be synchronized with the local databases.

Thus, as is apparent, present data distribution models suffer from significant shortcomings. Particularly in cases where local users accessing data in a distributed application most often require a particular subset of application data, replication of all data from a central data repository results in populating and updating the local database with more data than is necessary and therefore is inefficient for at least two reasons. First, replication of extra data consumes overhead, as noted above. Second, storing extra data in the local database causes the local database to consume more resources, such as storage space and processing resources, than is necessary. On the other hand, if a complete data set is not stored in the local database, then distributed users must seek some application data from a remote data repository, which may not be available or, at a minimum, can likely be accessed only inefficiently and by consuming extra processing and network resources. Particularly where data is distributed in more than one remote database, it can be difficult and inefficient to locate desired data.

Certain distributed applications have addressed the foregoing problems in application-specific ways. For example, it may be known that a certain subset of application data is accessed by local users of the application approximately ninety (90) percent of the times when the local user accesses data. Therefore, only this subset of the application data may be maintained in a local database without undue sacrifices of efficiency and overhead. Alternatively or in addition, it may be known that a certain subset of application data is stored in a particular remote database and may be accessed in a particular manner. Accordingly, the distributed application may employ a specific routine known to efficiently access such data in a remote database. However, these approaches require particular knowledge of a distributed application as well as the data it uses and often also require knowledge of a specific computing environment.

To overcome the foregoing shortcomings in retrieving data in distributed applications, it would be desirable to have a generic solution that provides retrieval of data from a plurality of separately maintained databases. It would further be desirable to avoid regular database synchronizations, and the vast overhead and inefficiencies that result therefrom. Further, it would be desirable to reduce the overall data storage capacity required for a distributed application, and to thereby reduce the costs associated with storing application data.

DETAILED DESCRIPTION OF THE PREFERRED EMBODIMENTS

Figure 1:
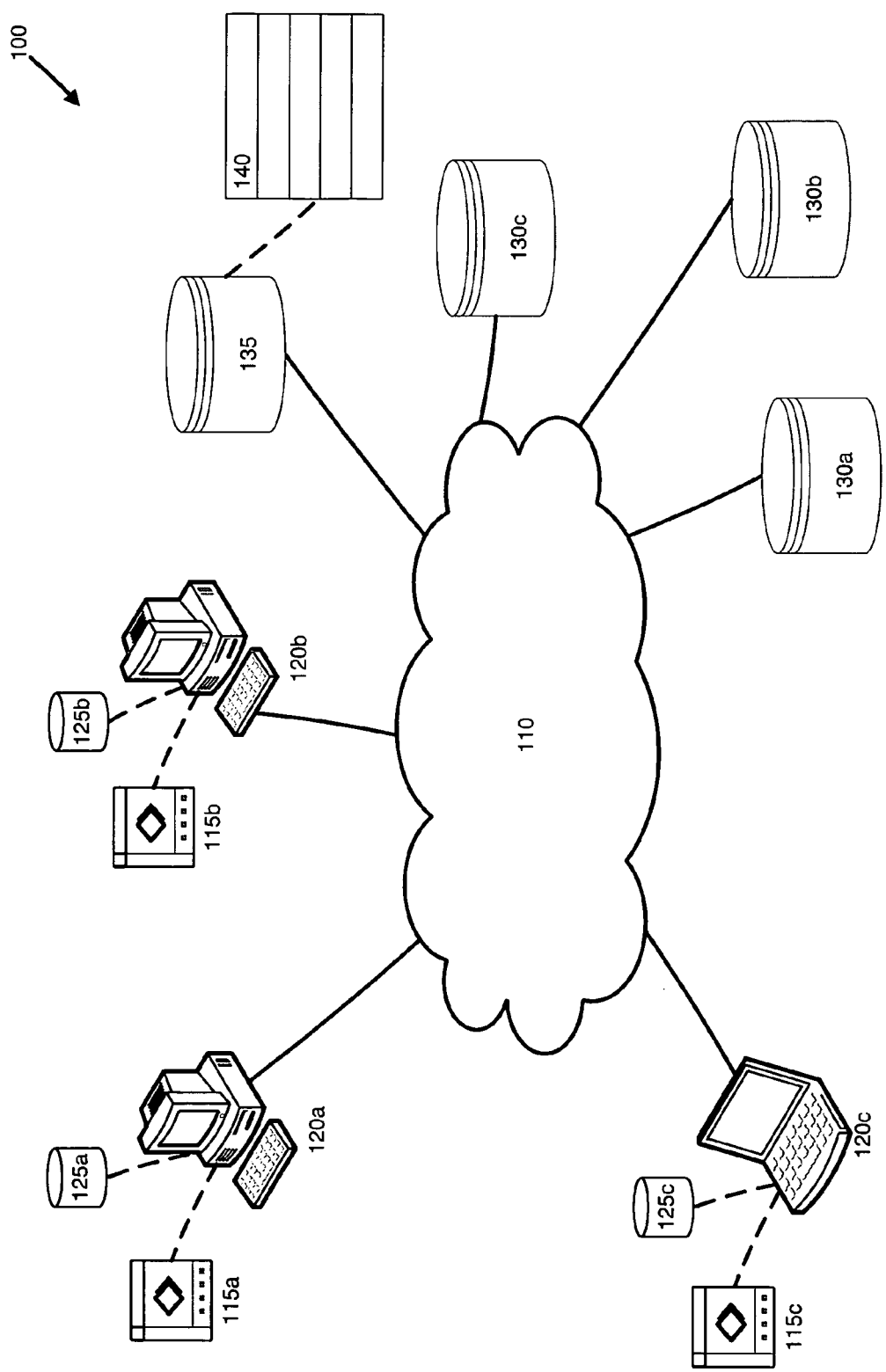
FIG. 1 is a block diagram showing a distributed system, according to an embodiment.

FIG. 1 is a block diagram showing an exemplary distributed system 100, according to an embodiment. Distributed system 100 uses a network 110 to link one or more distributed applications 115*a*, 115*b*, 115*c*, etc., included respectively on local computing devices 120*a*, 120*b*, 120*c*, etc., that in turn include or are connected to local databases 125*a*, 125*b*, 125*c*, etc. Remote databases 130*a*, 130*b*, 130*c*, etc. are accessible to the devices 120 via the network 110, as is location database 135. Location table 140 may be included in location database 135, although in some embodiments a specialized location database 135 is not present, and location table 140 is included in a remote database 130, some other database, or a specialized application. Location table 140 is generally accessed by local computing devices 120 via the network 110.

Network 110 may any one of, or a combination of a variety of, networks known to those skilled art, and preferably operates according to the well known Transfer Control Protocol/Internet Protocol (TCP/IP). Network 110 may include, without limitation, a Wide Area Network (WAN), Local Area Network (LAN), an intranet, the Internet, etc.

Distributed application 115 may be any kind of application capable of running on a computing device 120 that accesses distributed data. Examples of distributed applications 115 include, without limitation, document management systems, reporting applications, and the like.

Local computing devices 120 may be any one of a number of computing devices known to those skilled in the art, including, without limitation, a computer workstation, a desktop, notebook, laptop, or handheld computer, or some other computing device known to those skilled in the art, such as a Java-enabled cellular telephone or similar device. Computing devices 120 may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Local databases 125 and remote databases 130 each generally comprise a relational database management system (RDBMS) as known to those skilled in the art. However, it is to be understood that databases 125 and 130, in particular local databases 125, may be some other kind of database such as an application database in a proprietary format. Each local database 125 is generally, although not necessarily, included within the respective local computing device 120 to which the database 125 is local, or are otherwise locally connected to local computing devices 120, e.g., via a local network connection. It should be understood that local databases 125 may, but are not necessarily, included within distributed applications 115. Remote databases 130, on the other hand, are generally accessed by applications 115 running on computing devices 120 via network 110. Remote databases 130 generally include a computing device employing a computer operating system such as one of those mentioned above, and are accessed via network 110 in any one or more of a variety of manners known to those skilled in the art.

Further, embodiments are possible in which a local database 125 also serves as a remote database 130; for example, a local computing device 120a may be associated with a local database 125a, which also serves as a remote database 130 for local computing devices 120b, 120c, etc. In such a case, the local database 125a could be accessed by local computing devices 120b, 120c, etc. via network 110.

In general, those skilled in the art will recognize that the various systems and methods described herein, including without limitation distributed applications 115, may be implemented as instructions executable by one or more computing devices. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figures 2, 3:
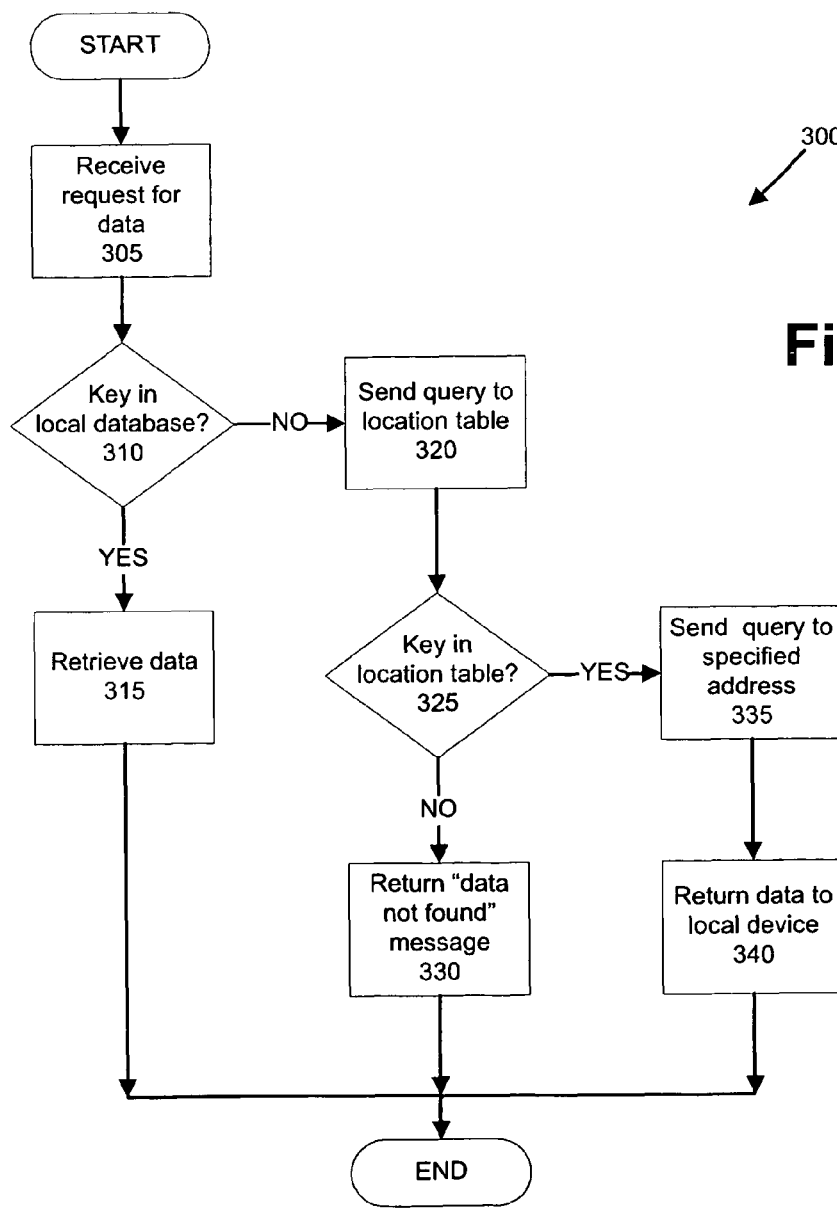
FIG. 2 illustrates the contents of a location table 140, according to an embodiment.
FIG. 3 depicts a process for retrieving data in a distributed application, according to an embodiment.

In preferred embodiments, location table 140 is a conventional table in a relational database, and contains data that may be accessed in a conventional manner. However, location table 140 is accessed by distributed applications 115 not to obtain actual application data but rather to obtain the location(s) for requested application data. FIG. 2 illustrates the contents of a location table 140, according to an embodiment. As can be seen in FIG. 2, location table 140 contains location information, e.g., addresses, associated with identifiers, e.g., data keys 210, used by distributed application 100.

A data key 210 is generally a primary key such as is known for use in a relational database. Accordingly, it is to be understood that, although FIG. 2 shows key 210 as a simple key, i.e., key 210 occupies a single column of table 140, embodiments are also possible, even likely, in which key 210 is a compound key occupying two or more columns of location table 140. Embodiments are also possible in which key 210 comprises a range of keys all associated with the same addresses 220 and 230.

Primary addresses 220 and secondary address 230 are addresses for accessing data associated with a key 210. The purpose of specifying both a primary address 220 and a secondary address 230 associated with each data key 210 is to account for redundant network connections, as will be understood by those skilled in the art. However, it is to be understood that embodiments are possible in which location table 140 includes a column for primary addresses 220, but not secondary addresses 230, and also that embodiments are possible in which location table 140 includes more than two columns for specifying addresses associated with each data key 210. In one embodiment, addresses 220 and 230 are Internet Protocol addresses such as TCP/IP addresses for locating the remote database 130 that contains data associated with a key 210. However, addresses 220 and 230 could also comprise a data source name (DSN), a computer name, a database name, a network path, or any other way of identifying a database known to those skilled in the art.

Because the actual data for distributed application 115 is maintained in databases 125 and/or 130, location table 140 requires little updating and is therefore easy to maintain. Generally, table 140 is updated only when a key 210 is added to or deleted from a local database 125.

FIG. 3 depicts a process 300 for retrieving data in a distributed application 115, according to an embodiment.

In step 305, a request for data is received in a local computing device 120. It should be understood that this request is received as part of the processing of a distributed application 115, and may or may not be the result of input from a user. The requested data is associated with an identifier, generally a key 210.

Next, in step 310, distributed application 115 determines whether the key 210 can be found in the local database 125 associated with the local computing device 120. If yes, control proceeds to step 315. Otherwise, control proceeds to step 320.

In step 315, the requested data is retrieved from the local database 125, and returned to the distributed application 115. Following step 315, the process 300 terminates.

Steps 310 and 315 are optional, but preferred in embodiments in which it is likely that a requested key 210 will be present in the local database 125. However, in embodiments where local database 125 is not present, or in which the requested key 210 is unlikely to be found in local database 125, these steps may be omitted.

In step 320, the distributed application 115 sends its query for the key 210 to location database 135.

Next, in step 325, location database 135 determines whether the data key 210 is in location table 140. If not, control proceeds to step 330. However, if the data key 210 is present in the location table 140, control proceeds to step 335.

In step 330, location database 135 returns a message to application 115 indicating that the requested data key 110 was not found in location table 140. Following step 330, the process 300 terminates.

In step 335, location database 135 sends a query to an address 220 associated with the requested key 210 in location table 140. This query includes information concerning the location of the local computing device 120 and the instance of the application 115 that requested the key 210 so that a response to the query may be returned to the proper location in the network 110. Alternatively, embodiments are possible in which location database 135 returns the address of the remote database 130 containing the requested key 210 to the local computing device 120 associated with the instance of the application 115 that requested the key 210. The distributed application 115 may itself be programmed to request the desired data associated with the key 210 directly from the appropriate remote database 130.

Next, in step 340, the remote database 130 to which the query of step 335 was sent returns the requested data to the requesting application 115.

Following step 340, the process 300 terminates.

CONCLUSION

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving a request for a datum in a first computing device;
   searching a location table for an identifier associated with the datum, the location table including a location of a second computing device that includes a remote database, the remote database including the datum; wherein the location is associated with the identifier;
   determining a location of the second computing device that includes the remote database;
   sending a request for the datum to the second computing device according to the location; and
   sending the requested datum from the second computing device to the first computing device.

2. The method of claim 1, wherein the location table comprises a plurality of locations for the datum, each location being associated with a computing device that includes a remote database, where each remote database includes the requested datum.

3. The method of claim 1, wherein the location is an Internet Protocol (IP) address.

4. The method of claim 1, wherein the remote database comprises the location table.

5. The method of claim 1, further comprising
   determining, following the receiving step, whether the datum is included in a local database in the first computing device, and if the datum is included in the local database, then sending a request for the datum to the local database in the first computing device.

6. The method of claim 1, wherein the location table is comprised in a relational database.

7. A tangible computer-readable medium comprising a set of computer-executable instructions, the instructions comprising instructions for:
   receiving a request for a datum in a first computing device;
   searching a location table for an identifier associated with the datum, the location table including a location for a second computing device that includes a remote database, the remote database including the datum; wherein the location is associated with the identifier;
   determining a location of the second computing device that includes the remote database;
   sending a request for the datum to the second computing device according to the location; and
   sending the requested datum from the second computing device to the first computing device.

8. The medium of claim 7, wherein the location table comprises a plurality of locations for the datum, each location being associated with a computing device that includes a remote database, where each remote database includes the requested datum.

9. The medium of claim 7, wherein the location is an Internet Protocol (IP) address.

10. The medium of claim 7, wherein the remote database comprises the location table.

11. The medium of claim 7, further comprising instructions for determining, after the request is received, whether the datum is included in a local database, and if the datum is included in the local database, sending a request for the datum to the local database.

12. The medium of claim 7, wherein the location table is comprised in a relational database.

13. A system, comprising:
   a first computing device that includes a location table, the location table comprising a data identifier associated with a location; and
   a second computing device that includes a remote database comprising the data identifier and a datum associated with the data identifier, wherein the first computing device is configured to
   receive a request for the datum,
   search the location table for one of the plurality of data identifiers associated with the datum,
   determine the location based on the data identifier associated with the datum, where the location identifies the second computing device, and
   send a request for the datum to the second computing device according to the location.

14. The system of claim 13, wherein the remote database comprises the location database.

15. The system of claim 13, wherein the second computing device is configured to provide the datum to the first computing device in response to the request for the datum.

16. The system of claim 13, wherein the location table comprises a plurality of locations for the datum, each location being associated with a computing device that includes a remote database, where each remote database includes the requested datum.

17. The system of claim 13, wherein the location is an Internet Protocol (IP) address.

18. The system of claim 13, wherein the location table is comprised in a relational database.

19. The system of claim 13, wherein the first computing device is further configured to determine, after the request is received, whether the datum is included in a local database, and if the datum is included in the local database, send a request for the datum to the local database.

20. The method of claim 1, wherein the location table is included in a second remote database.

21. The medium of claim 7, wherein the location table is included in a second remote database.

22. The method of claim 1, wherein the location is indicated in the location table by a primary address and a secondary address.

23. The medium of claim 7, wherein the location is indicated in the location table by a primary address and a secondary address.

24. The system of claim 13, wherein the location is indicated in the location table by a primary address and a secondary address.

25. The method of claim 1, wherein the request is received from a distributed application located in a third computing device that is at a network location distinct from each of the first computing device and the second computing device.

26. The medium of claim 7, wherein the request is received from a distributed application located in a third computing device that is at a network location distinct from each of the first computing device and the second computing device.

* * * * *